Figure 1:
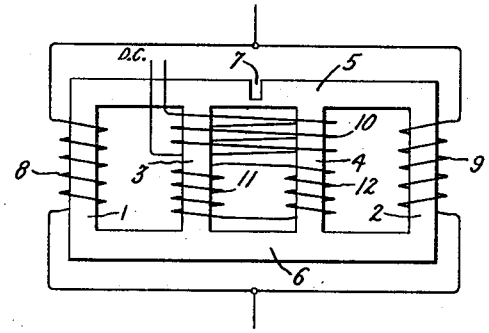

Nov. 28, 1944.  H. W. LORD  2,363,881
REACTOR
Filed Sept. 16, 1941

Inventor:
Harold W. Lord,
by Harry E. Dunham
His Attorney.

Patented Nov. 28, 1944

2,363,881

UNITED STATES PATENT OFFICE 2,363,881

REACTOR

Harold W. Lord, Schenectady, N. Y., assignor to General Electric Company, a corporation of New York Application September 16, 1941, Serial No. 410,969

5 Claims. (Cl. 171—242)

This invention relates to alternating current reactors and more particularly to improvements in direct current saturated type reactors.

As is well known, there are a number of different arrangements in which one or more alternating current windings and one or more direct current windings are mounted on the same core so that variations in current in the direct current winding or windings varies the permeability of the core by reason of magnetic saturation and thus in turn varies the reactance or voltage of self-induction of the alternating current winding or windings. By means of well-known three-legged or four-legged core constructions the alternating flux is prevented from inducing an alternating voltage in the direct current control circuit and the unidirectional flux is prevented from producing even harmonics in the alternating current.

Heretofore, such reactors have been characterized by a range in reactance of their alternating current windings of about 10 or 12 to 1, the maximum reactance value occurring with zero direct current and the minimum reactance value occurring with maximum direct current and full saturation of the magnetic core. However, in certain applications of these variable reactors, it is desirable to reduce the range of reactance to about 4 to 1. Examples of such applications are illumination control of fluorescent lamps by connecting the reactors in series with the lamps and voltage phase shifting circuits for controlling the operation of vacuum tubes. In most of such applications it is desirable to have one extreme range of operation of the reactor coincide with zero direct current so that in case there should be accidental failure of the direct current the circuit will not operate abnormally. It is also desirable to have the other extreme range of operation correspond to the maximum direct current which the direct current winding is designed to carry so that full use may be made of the materials of the reactor.

In accordance with this invention I provide a novel reactor construction which accomplishes all of the above results. This reactor is characterized by having an air gap or its equivalent in its magnetic core and by having an effectively short circuited winding for forcing the alternating flux through this air gap. As a short circuited winding will have no appreciable effect on the steady value of direct saturating current, the unidirectional flux is not forced through the air gap and can take a path of higher permeability through the magnetic material of the core. The forcing of the alternating flux through the air gap greatly increases the magnetizing current of the reactor with zero direct current flowing in its control winding so that the effective reactance of the reactor under these conditions is materially decreased when compared with a conventional reactor. Moreover this decrease is obtained without resort to abnormally high alternating flux densities. The reactor is therefore relatively insensitive to variations in alternating voltage.

An object of the invention is to provide a new and improved direct current saturated reactor.

Another object of the invention is to provide a direct current saturated reactor having a maximum range of reactance values which is of the order of about 4 to 1.

The invention will be better understood from the following description taken in connection with the accompanying drawing and its scope will be pointed out in the appended claims.

Figure 2:
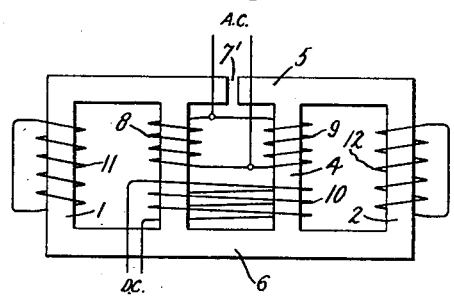
Figure 3:
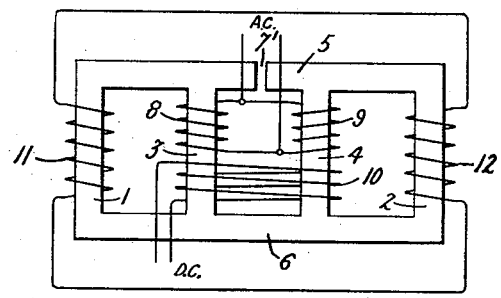

In the drawing Fig. 1 shows an embodiment of the invention in which the alternating flux has a relatively long path, Fig. 2 is a modification in which the alternating flux has a much shorter path and therefore the core losses are less than in Fig. 1, and Fig. 3 is a modification of Fig. 2 in which the short circuited windings are arranged to prevent damping of changes in the unidirectional flux so that the speed of response of the reactor is increased.

Referring now to the drawing, and more particularly to Fig. 1, there is shown therein a four-legged magnetic core member comprising a pair of outer legs 1 and 2 and a pair of inner legs 3 and 4 together with upper and lower yoke members 5 and 6 for joining the legs together. In the upper yoke member 5 between the inner legs 3 and 4 there is an air gap 7 which is shown by way of example as a bridged air gap in that it is not cut all the way through the yoke member but leaves a so-called restricted section. As all of the yoke flux passing between the center legs 3 and 4 must go through this restricted section it will saturate and thus provide a lower permeability section than would be the case if the cut-away portion were filled with the same material as the rest of the core.

Mounted on the outer legs are alternating current windings 8 and 9 respectively which are shown by way of example as being connected in parallel with each other, although they might be connected in series if desired. However, they are wound in such relative directions as to have additive instantaneous magnetomotive forces around the magnetic path constituting the outer legs 1 and 2 and the yoke members 5 and 6.

The reactor is controlled by a direct current saturating winding 10 shown for example as wound around both of the inner legs 3 and 4.

By reason of the air gap 7 the alternating flux from the winding 8 tends to return through the inner leg 3 and similarly the alternating flux produced by the winding 9 tends to return through the inner leg 4. This is prevented by a pair of effectively short circulated windings 11 and 12, these windings being shown as short circuited on each other by being connected in series. This series connection is such that any voltage or current induced in the winding 11 by the flux produced by the winding 8 is additive to the current or voltage which may be induced in the winding 12 by the flux produced by the winding 9. Consequently, the windings 11 and 12 act as damping windings and practically prevent any flow of alternating flux through the inner legs 3 and 4 so that the alternating flux is all forced through the air gap 7, thus substantially reducing the reactance of the reactor when no direct current flows in the direct current saturating winding 10.

However, when unidirectional current is caused to flow in the winding 10 it will produce flux which will flow in the same direction in the inner legs 3 and 4 and which will then return through the outer legs 1 and 2 respectively. The greater this value of flux the lower the permeability of the core by reason of the magnetization characteristic of the core material so that the reactance of the alternating current windings 8 and 9 will decrease as direct current through the winding 10 increases.

In view of the fact that alternating flux tries to flow in the center legs 3 and 4 in opposite instantaneous directions the voltages which will be induced in the windings 11 and 12 by changes in unidirectional flux produced by the winding 10 will be equal and opposite to each other and will therefore cancel out. This, of course, is because the unidirectional flux produced by the winding 10 flows in the same direction in the center legs 3 and 4. The result is that changes in unidirectional flux in the reactor are undamped by the windings 11 and 12.

When the reactor of Fig. 1 is reduced to its essentials it comprises a first magnetic circuit including the legs 1 and 2, the yokes 5 and 6 and the air gap 7 and a second magnetic circuit including the legs 1 and 3 and the portions of the yokes 5 and 6 therebetween. These two magnetic circuits have in common the leg 1 and the portions of the yokes 5 and 6 between the legs 1 and 3. The short circuited winding 11 being on the leg 3 is exclusively on the flux path which does not include the air gap 7. The alternating current winding 8 being on the common portion of the two flux paths tends to send alternating flux through both of them but the short circuited winding prevents the flux from flowing through the leg 3 and forces it through the gap 7. The direct current winding being on the same flux path with the short circuited winding 11 sends flux through the flux path which does not include the air gap.

In Fig. 2 the locations of the alternating current and short circuited windings are reversed. Thus, the alternating current windings 8 and 9 are on the center legs 3 and 4 respectively, while the short circuited windings 11 and 12 are on the outer legs 1 and 2 respectively. This materially shortens the length of the flux path for the alternating flux and thereby reduces the core losses in the reactor.

The operation of Fig. 2 is similar to Fig. 1 in that the short circuited windings 11 and 12 prevent the alternating flux produced by the windings 8 and 9 from straying out into the legs 1 and 2 so that the alternating flux is forced through the full air gap 7'. Variations in current in the direct current winding 10 will vary the permeability of the rest of the path of the alternating flux thereby serving as means for further reducing the reactance of the reactor.

Also, the short circuited windings 11 and 12 are short circuited on themselves. They therefore tend to damp or retard any changes in unidirectional flux produced by the winding 10 so that the time of response of the reactor of Fig. 2 is materially greater than that of Fig. 1. By "time of response" is meant the time interval between a change in current in the direct current winding 10 and the resulting change in reactance of the alternating current windings 8 and 9.

Fig. 3 differs from Fig. 2 in that the short circuited windings 11 and 12 are connected in series in the same manner that they are in Fig. 1. Thus, they prevent the alternating flux from the windings 8 and 9 from flowing in the legs 1 and 2. Such flux tends to flow in the legs 1 and 2 in opposite instantaneous directions, that is to say, if it tends to flow up in leg 1 it will tend to flow down in leg 2 and vice versa. Therefore, the windings 11 and 12 will have no effect on changes of unidirectional flux produced in the winding 10 for such flux if it tends to flow up in the leg 1 will also tend to flow up in the leg 2 at the same time.

When the reactor of Fig. 2 or Fig. 3 is reduced to its essentials, in a manner similar to that in which the reactor of Fig. 1 was reduced to its essentials above, it will be seen that the leg 3 may be considered the common portion of two flux paths, one of which comprises legs 3 and 4 with the air gap 7 and the intervening yoke portions while the other comprises the legs 1 and 3 with the interconnecting yoke portions. The air gap 7 is exclusively in one of these paths and the short circuited winding 11 is exclusively on the other of these paths while the alternating and direct current windings are both on the common portion.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a four-legged magnetic core provided with a pair of yoke members, an air gap in one of said yoke members between the two inside legs, a pair of alternating current windings wound respectively on said outside legs, a direct current winding wound around both of said inside legs, and a pair of effectively short circuited windings wound respectively on said inside legs.

2. In combination, a four-legged magnetic core provided with a pair of yoke members, an air gap in one of said yoke members between the two inside legs, a pair of alternating current windings wound respectively on said inside legs, a direct current winding wound around both of said inside legs, and a pair of effectively short circuited windings wound respectively on said outside legs.

3. The combination as defined in claim 1 in which the short circuited windings are connected in series aiding with respect to electrical effects induced therein by said alternating current windings.

4. The combination as defined in claim 2 in which the short circuited windings are connected in series aiding with respect to electrical effects induced therein by said alternating current windings.

5. A direct-current saturable reactor comprising, in combination, a core provided with at least two magnetic circuits having a common portion, means for circulating an alternating flux in at least one of said circuits, an air gap in the circuit of said alternating flux whereby said alternating flux tends to be diverted into the remainder of said core, means for circulating a unidirectional flux through said remainder of the core, and short-circuited windings on said remainder of the core, said short-circuited windings being so interconnected that they oppose the flow of said alternating flux in said remainder of the core while offering no opposition to a change in unidirectional flux in said remainder of the core.

HAROLD W. LORD.